United States Patent [19]
Liden

[11] Patent Number: 5,739,770
[45] Date of Patent: Apr. 14, 1998

[54] OFF-PATH DESCENT GUIDANCE BY A FLIGHT MANAGEMENT SYSTEM

[75] Inventor: Sam P. Liden, Phoenix, Ariz.

[73] Assignee: Honeywell Inc., Minneapolis, Minn.

[21] Appl. No.: 586,264

[22] Filed: Jan. 16, 1996

[51] Int. Cl.⁶ ............................................. G01C 21/00
[52] U.S. Cl. ................................. 340/976; 364/430
[58] Field of Search ..................... 340/971, 972, 340/976; 364/424.014, 424.013, 424.06, 430, 429, 439; 244/186, 187

[56] References Cited

U.S. PATENT DOCUMENTS

| | | | |
|---|---|---|---|
| 3,478,310 | 11/1969 | Cone, Jr. | 364/429 |
| 3,868,497 | 2/1975 | Vietor | 364/430 |
| 4,164,340 | 8/1979 | Simpson | 364/429 |
| 4,709,336 | 11/1987 | Zweifel | 364/430 |
| 4,792,906 | 12/1988 | King et al. | 364/424.014 |
| 4,825,374 | 4/1989 | King et al. | 364/424.014 |
| 5,111,400 | 5/1992 | Yoder | 364/439 |

*Primary Examiner*—Brent A. Swarthout
*Attorney, Agent, or Firm*—Art Sapelli

[57] ABSTRACT

A method for providing off-path guidance during a descent comprises the steps of determining a current altitude (H) and a corresponding current horizontal distance (X) of the aircraft from a selected bottom of descent point (B/D). A simulation of a Basic Descent Path (BDP) is performed, and a plurality of corresponding altitude ($H_i$) and horizontal distance ($X_i$) points is stored in a BDP array. A horizontal distance ($X_B$) is determined from the B/D point to a bottom point of the BDP array, and a horizontal distance ($X_A$) is determined in the BDP array that corresponds to the current aircraft altitude. A radius of a BDP circle is obtained by subtracting $X_B$ from $X_A$ for display on a navigation display unit. An aircraft symbol is displayed on the Navigation Display unit at a distance proportional to $X_A$, thereby indicating the distance remaining until to start of descent of the aircraft.

1 Claim, 3 Drawing Sheets

OFF-PATH DESCENT GUIDANCE BY A FLIGHT MANAGEMENT SYSTEM

BACKGROUND OF THE INVENTION

The present invention relates to a Flight Management System, and more particularly, to a method for providing guidance during descent, especially after an aircraft has departed from a planned descent path or when a descent path is not provided for any reason.

One of the many functions of an FMS (Flight Management System) is to construct a flight path from the aircraft position to the destination which is then used as a reference for lateral and vertical guidance. The lateral component of the path is defined by waypoints and various types of line segments connecting the waypoints. Such a sequence of waypoints and connecting line segments is referred to as a flight plan. Before takeoff, the flight plan begins at the origin runway threshold.

The vertical component of the path is composed of three principal phases: climb, cruise and descent. As part of the performance function of an FMS, a descent path is constructed from a T/D (top of descent) point at the final cruise altitude, to a defined E/D (end of descent) point with a prescribed altitude constraint. The E/D point may, for example, be the destination runway threshold, 50 ft above the runway, or it may be some other earlier waypoint, such as the FA (final approach) fix. The E/D point is selected as part of the flight planning function of the FMS. The descent path is then constructed so that the aircraft will arrive at the E/D point using selected speed and thrust profiles in the descent phase, and so that prescribed speed and altitude constraints at various descent points are satisfied.

The descent path is usually defined in terms of an array of altitude versus distance points, where distance is the horizontal along-track distance to the E/D point, and altitude is barometric altitude. The path is made up of straight-line segments connecting these points. The array is usually computed by the FMS performance function by doing backward simulated flight from the E/D point up to the final cruise altitude. A typical descent path array may have 30 points. The altitude and distance values obtained at each array point depend on a multitude of factors including: the integration interval (step size) used in the simulation algorithm, prescribed speed and altitude constraints at selected waypoints, the policy speed profile (usually a Mach/CAS schedule down to 10,000 ft and 250 kn CAS below this altitude), wind and temperature forecast data, track direction relative to the wind direction, aircraft gross weight at each point, guidance laws (such as the turn radius in a turn), and aerodynamic characteristics of the aircraft (thrust, drag, fuel-flow, speed envelope, ...) as required for flight simulation.

When the flight goes as planned, the aircraft starts descent at the T/D point, usually with throttles at idle on descending segments, and is automatically guided to stay on the descent path all the way to the E/D point. However, it is quite common that ATC (Air Traffic Control) directs the aircraft to leave the planned path to avoid traffic conflicts in the terminal area. The aircraft may be directed by ATC, for example, to fly a given heading and altitude until further notice (a process known as "vectoring"). In such situations the computed descent path is of little or no use.

Thus, there is a need to provide information to help the pilot guide the aircraft vertically down to a selected point, referred to here as the B/D (bottom of descent) point, especially after the aircraft has departed from the planned descent path, or when a descent path is not provided for any reason. The B/D point is normally the same as the E/D point of the flight plan, but it may be selected to be any arbitrary waypoint with an altitude constraint (the altitude at which the aircraft must cross the waypoint). This information is provided via a graphic display, the type of display provided being useful even when the aircraft is on the normal path and can be made available long before the aircraft reaches the descent phase. The type of information provided is essentially described in U.S. Pat. No. 4,825,374, entitled "Aircraft Descent Guide System and Method for Creating Descent Guidance Information," by King et al. The method of computing this information in the present invention is different.

SUMMARY OF THE INVENTION

Therefore, there is provided by the present invention, a method for providing vertical guidance during a descent, especially after an aircraft has departed from a planned descent or when a descent path is not provided for any reason. The method comprises the steps of determining a current altitude (H) and a corresponding current horizontal distance (X) of the aircraft from a predetermined bottom of descent point (B/D). A flight simulation of a Basic Descent Path (BDP) is performed, and a plurality of corresponding altitude ($H_i$) and horizontal distance ($X_i$) points is stored in a BDP array, obtained from this simulation. A horizontal distance ($X_B$) is determined from the B/D point to a bottom point of the BDP array, and a horizontal distance ($X_A$) is determined in the BDP array that corresponds to the current aircraft altitude. A radius of a BDP Circle is obtained by subtracting $X_B$ from $X_A$ for display on a navigation display unit. An aircraft symbol is displayed on the navigation display unit at a distance proportional to $X_A$, thereby indicating the distance remaining until to start of descent on the BDP.

Accordingly, it is an object of the present invention to provide a method for guiding an aircraft vertically during descent.

It is still another object of the present invention to provide a method for guiding an aircraft vertically during descent after the aircraft has departed from a planned descent path.

These and other objects of the present invention will become more apparent when taken in conjunction with the following description and attached drawings, wherein like characters indicate like parts, and which drawings form a part of the present application.

DETAILED DESCRIPTION

Figure 1:
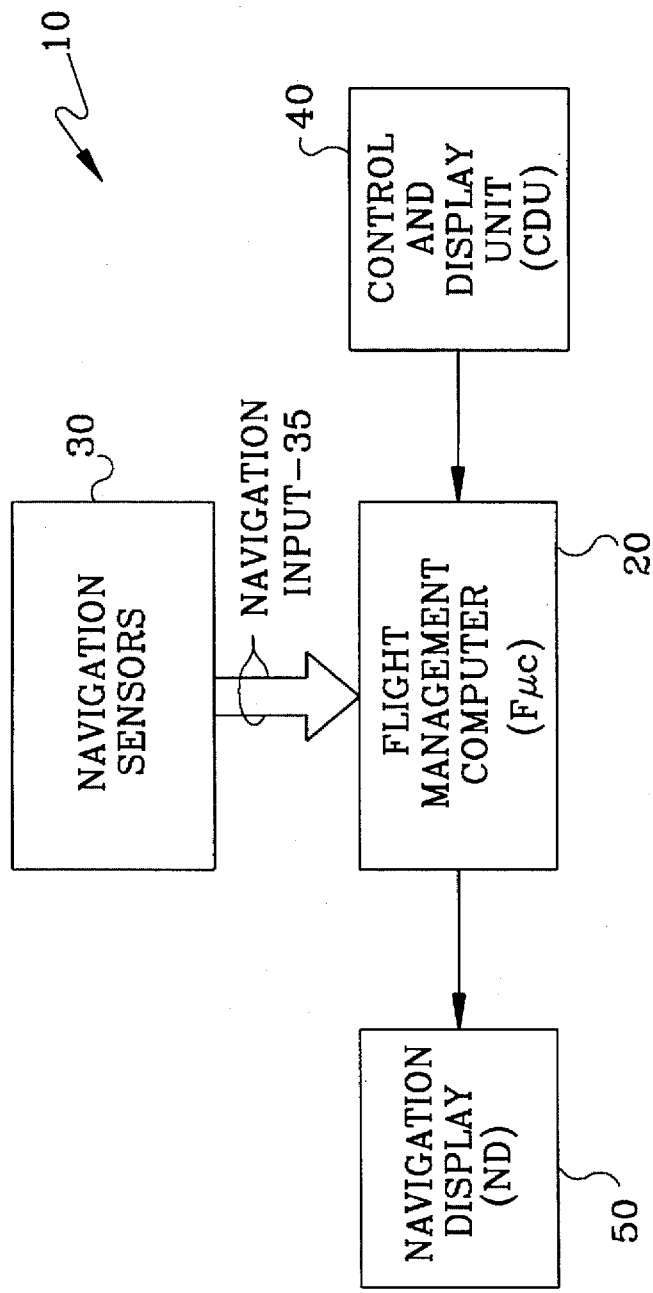
FIG. 1 shows a partial block diagram of an aircraft navigation system.

Referring to FIG. 1, there is shown a partial block diagram of a Flight Management System (FMS) 10 which includes a Flight Management Computer (FMC) 20. The FMS 10 includes navigation sensors 30 for supplying navigation inputs 35 to the FMC 20. The FMC 20 also includes a Control and Display Unit (CDU) 40 for supplying data to the FMC 20, the data including flight plan data. A Navigation Display (ND) 50 is provided in the aircraft cockpit for displaying navigation information to the pilot, including data in accordance with the method of the present invention which will be described hereinunder.

Figure 2:
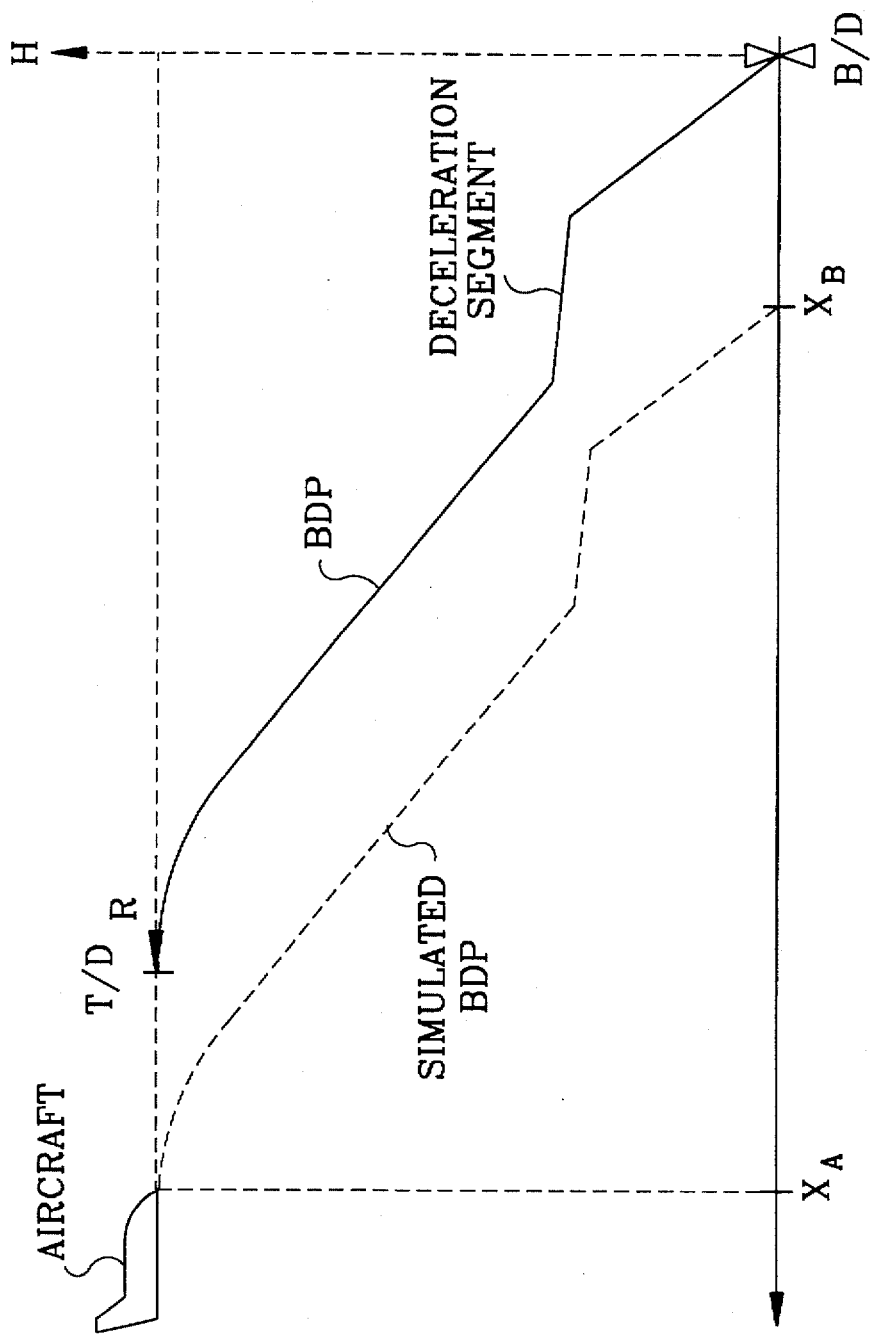
FIG. 2 shows a typical BDP vertical descent profile of an aircraft.

As discussed above, the vertical component of a flight path is composed of three principal phases: climb, cruise, and descent. Referring to FIG. 2, there is shown a typical vertical profile of a Basic Descent Path (BDP) of an aircraft. A BDP goes direct from the aircraft position to the B/D point, in a straight line laterally, and vertically in accordance with a selected speed mode (for example, the Economy speed mode), but without altitude and speed constraints as may be entered at waypoints in the descent phase of the flight plan. The BDP does, however, include the normal 250 knot speed limit below 10,000 feet, and the required deceleration segment just above this altitude, as shown in FIG. 2.

Figure 3:
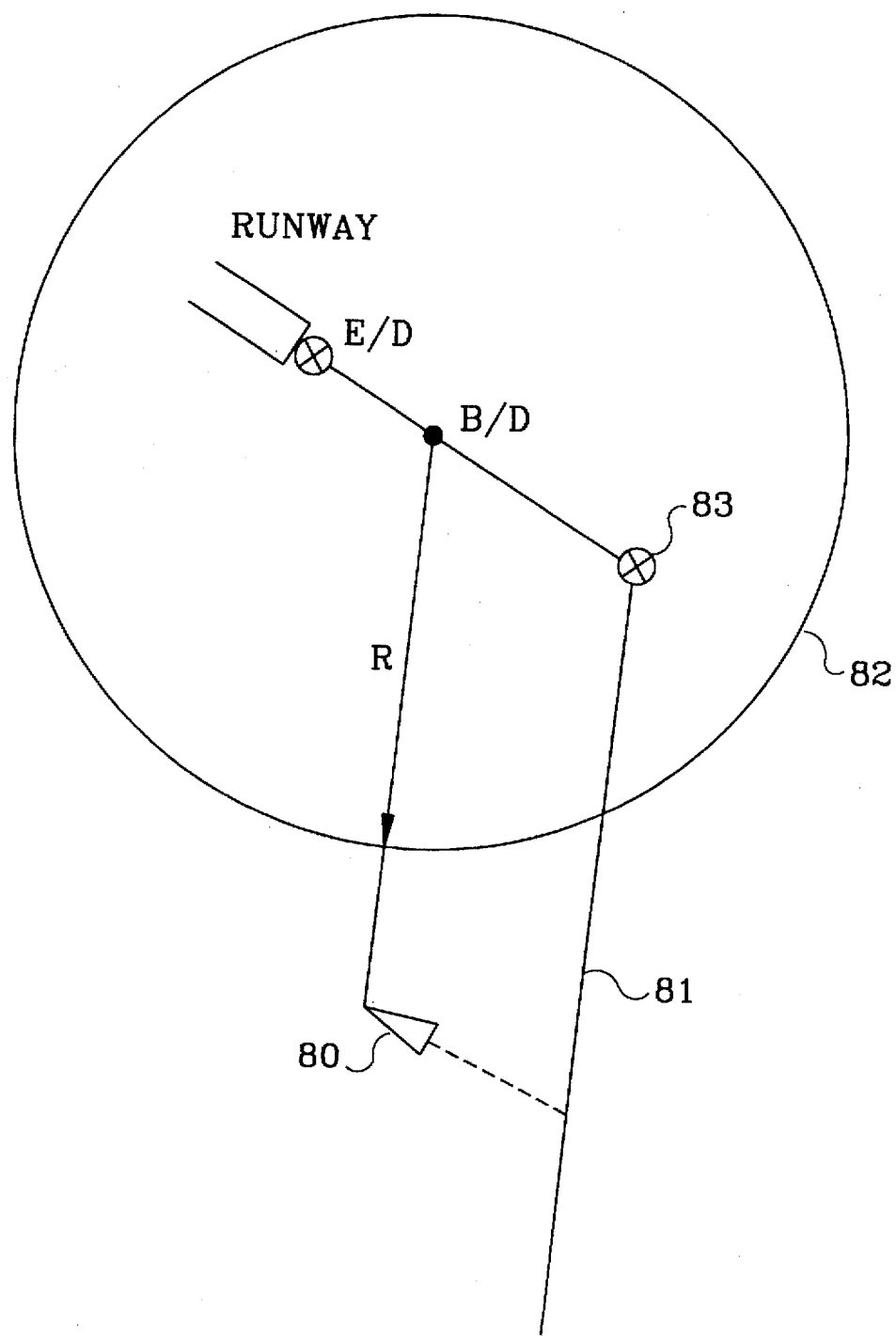
FIG. 3 shows an example of how a BDP Circle may be displayed on a Navigation Display unit when the aircraft has departed from the original descent plan.

Referring to FIG. 3, there is shown an example of display graphics related to the BDP as it may appear on the ND 50. The E/D waypoint for the flight plan 81 is at the runway threshold, and the B/D point is selected for this example to be an earlier waypoint on the flight plan. In general, the B/D waypoint may be selected to be any waypoint in the general vicinity of the destination airport, and not necessarily on the original flight plan. The aircraft 80 in this example has departed from the flight plan 81 and is located at a distance $X_A$ from the B/D waypoint. The BDP Circle 82 (also sometimes referred to as an Energy Circle), having radius R, indicates where the aircraft should begin descent from the current aircraft altitude.

The BDP Circle is normally displayed for a "clean" aircraft configuration. (The aircraft is descending with the throttle pulled back near its minimum operating setting, and air drag inducing devices are in the retracted, minimum drag configurations.) Another smaller circle may be displayed for descent with speed brakes deployed.

When the aircraft has reached the BDP Circle, the pilot can use the desired circle as a guide for descent by adjusting vertical speed so that the tip of the aircraft symbol on the ND 50 continuously touches the circle. The radius of the circle diminishes as the aircraft descends.

The BDP is typically based on idle thrust descent on a course direct to the B/D point, with a selected or computed Mach/CAS speed schedule at the higher altitudes, a deceleration segment to 250 kn CAS at 10,000 ft, and a constant 250 kn CAS descent segment to the B/D point. Speed or altitude constraints that may have been entered in the original descent plan are not applied. The radius R of the BDP Circle is the horizontal distance from the B/D point to the point where the current aircraft altitude intersects the BDP on a course direct to the B/D point.

The shape of the BDP vertical profile illustrated in FIG. 2, depends not only on the prescribed speed profile but also on the aircraft's aerodynamic characteristics, its gross weight, and on the wind and temperature forecast models assumed for the simulated flight. In the preferred embodiment, the off-path BDP is calculated by simulating the flight from the current point to a destination point, and the off-path BDP is stored in an array of altitude H versus distance X to the B/D point and is generated by simulated flight that takes into account all the factors that affect the descent path. The FMS performs the flight simulation in a manner well known by those skilled in the art. If the aircraft is within a specified distance $X_s$, such as 150 nmi, of the B/D, the simulation begins with the immediate descent from the aircraft altitude to the B/D altitude constraint, on a course direct to the B/D point, with X and H values stored in the BDP array at prescribed intervals. If the aircraft is further away from the B/D point than $X_s$, the BDP descent simulation is initiated after the normal FMS flight prediction has arrived at or near $X_s$ from the B/D, with initial conditions taken from the prediction state at that point. The BDP simulation is always on a direct course toward, and possibly past, the B/D point rather than along the flight plan, and terminates at the altitude constraint of the B/D point. The horizontal distance from the B/D point to the bottom of the BDP array, which is negative if the simulation has passed the B/D point, is denoted by $X_B$, as illustrated in FIG. 2.

The desired radius R is then obtained by first finding the X in the BDP array that corresponds to the current aircraft altitude, and then subtracting $X_B$ from this X. Finding the X for a given altitude H in the BDP array involves linear interpolation between altitude points in the array. Radius R can thus be computed as frequently as needed when the aircraft descends and R diminishes. When the course to the B/D point changes significantly, the along-track wind component (head or tail wind) may change, making it necessary to re-compute the BDP array. The BDP array recomputation is initiated whenever the course to the B/D point has changed by a specified angle (such as five degrees) from the previous course. It is also initiated periodically over time as gross weight estimates, etc., near the terminal area change with time, and whenever wind forecast data is changed, or the flight plan is changed in a way that can affect final gross weight.

When there is no wind the displayed circle represents the BDP "cone" from all directions. With wind, a slightly oval figure would more accurately represent the BDP intersection from all directions, but finding this figure would require a large number of descent path arrays to be computed and may be unnecessarily complex. By recomputing the BDP array periodically as described above the circular display is accurate where needed and provides accurate information to the pilot.

The BDP includes a deceleration segment to slow the aircraft down to 250 kn CAS (or some other specified speed) at 10,000 ft altitude. This deceleration is usually done by reducing vertical speed to 500 ft/min for a distance before 10,000 ft that is just long enough for the required deceleration. The normal descent path constructed by and automatically guided to by the FMS, places this segment so that the aircraft just attains 250 kn CAS at 10,000 ft. For the BDP the deceleration segment begins at a somewhat higher altitude, such as at 12,000 ft, to allow for some delay in the pilot's manual adjustment of vertical speed, thereby reducing the risk of missing the speed limit at 10,000 ft. An algorithm for defining the starting altitude of the deceleration segment that depends on the starting and ending speeds, and includes a reasonable margin for manual delay in adjusting vertical speed, can also be included in the preferred embodiment.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. A method for providing off-path descent vertical guidance of an aircraft by a Flight Management System (FMS), comprising the steps of:

a) determining a current altitude (H) and a corresponding current horizontal distance (X) of the aircraft from a predetermined bottom of descent point (B/D);

b) determining if X is less than a predetermined distance $X_s$;

c) if X is less than $X_s$ performing a flight simulation of basic descent to produce a Basic Descent Path (BDP) starting at X, otherwise performing a descent simulation starting at a point where X is at or near $X_s$ and using aircraft state data obtained from a previous flight plan prediction cycle;

d) storing a plurality of points, each of which corresponds to an altitude ($H_i$) and horizontal distance ($X_i$) in a basic descent path array of the BDP obtained from the flight simulation;

e) determining a horizontal distance ($X_B$) from the B/D point to a bottom point of the BDP array;

f) determining a horizontal distance ($X_A$) in the BDP array that corresponds to the current aircraft altitude;

g) subtracting $X_B$ from $X_A$, thereby obtaining a radius around the B/D point of a BDP Circle and displaying this circle on the ND (Navigation Display) unit; and h) displaying an aircraft symbol on the ND unit at a distance proportional to $X_A$ from the B/D point, thereby indicating the distance remaining until to start of descent of the aircraft.

\* \* \* \* \*